INFORMATION RECORDING AND DISPLAY WITH PARTICLE MIGRATION IN AN ELECTRIC FIELD

Filed Feb. 11, 1966

Inventor:
Joseph Gaynor,
by John M. Davis
His Attorney.

United States Patent Office 3,450,831
Patented June 17, 1969

3,450,831

INFORMATION RECORDING AND DISPLAY WITH PARTICLE MIGRATION IN AN ELECTRIC FIELD

Joseph Gaynor, Schenectady, N.Y., assignor to General Electric Company, a corporation of New York
Filed Feb. 11, 1966, Ser. No. 526,757
Int. Cl. H04n 5/76, 3/16, 5/44
U.S. Cl. 178—6.6 21 Claims

ABSTRACT OF THE DISCLOSURE

An information recording and display system has a film of liquid dielectric recording material on a substrate, with fine particles suspendend in the film. The particles migrate through the film when subjected to a non-uniform electric field, forming an image. The liquid film may be a heated thermoplastic, permitting cooling to retain the image.

Figure 1:
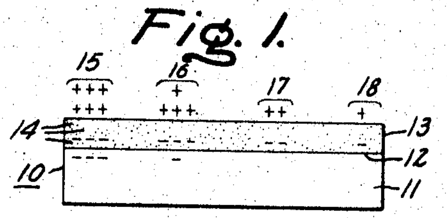

This invention relates to the development of electrostatic charge or force patterns to form visible image patterns and more particularly to a recording medium, a system, and a method for producing a visible image in the recording medium which has a point-to-point correspondence with a previously applied electrostatic charge or force pattern which was modulated in accordance with the image pattern to be recorded or reproduced.

One of the principal problems encountered in all previously known methods of recording information which are based upon electrostatic charge or force patterns has been in the image development step. In general, these previously known electrostatic recording or reproducing techniques may be said to fall into two groups. In the first group, which for convenience may be referred to as the conventional "hard copy" processes, a charge pattern is established on the surface of the recording medium, which may be a sheet of paper, and finely divided dry powder or ink is selectively electrostatically attracted to or repelled from the charge pattern on the medium, depending upon the respective polarities of the particles and the charge pattern. Special techniques are required in the preparation, storage, and maintenance of these materials, the development step is clumsy, and excess material must somehow be eliminated from the hard copy. Furthermore, these "powder developed" images exhibit little or no continuous tone or gray scale and usually show a pronounced "edge effect" when relatively large dark areas are attempted to be reproduced. The second group usually involves the establishment of an electrostatic charge or force pattern on or in a supported film of a dielectric, thermally deformable plastic material, which upon heating to its softening point forms a ripple or groove pattern in its surface corresponding to the charge or force pattern. Upon cooling, these surface deformations are frozen in the surface and the information or image formed thereby is retrieved by special optical means. Usually schlieren optics are required to permit viewing and these systems are somewhat more expensive than conventional transmission optics. In addition, these latter recording techniques have two additional disadvantages in that the projected images are dimmer for a given amount of light produced by the projector light source and the image must be broken up or "sampled" to get continuous tone or gray scale.

In view of the foregoing, it is a principal object of this invention to provide a solid electrostatic recording medium which may be developed by a thermal treatment to produce an image which may be viewed directly or projected by conventional non-schlieren optical apparatus.

A further object of the invention is the provision of an image in an electrostatic recording medium by causing non-transport particles suspending in an otherwise transparent liquid dielectric medium to migrate under the influence of a non-uniform electrostatic charge or force pattern to form a pattern corresponding to the charge pattern.

Figure 2A:
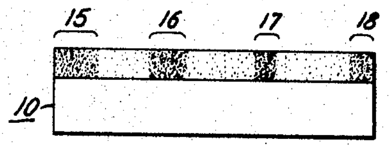
Figure 3:
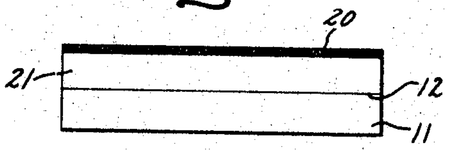
Figure 2B:
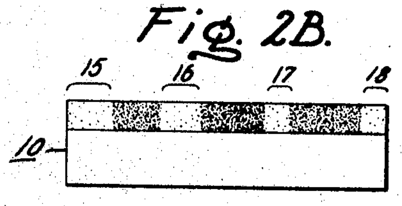
Figure 4:
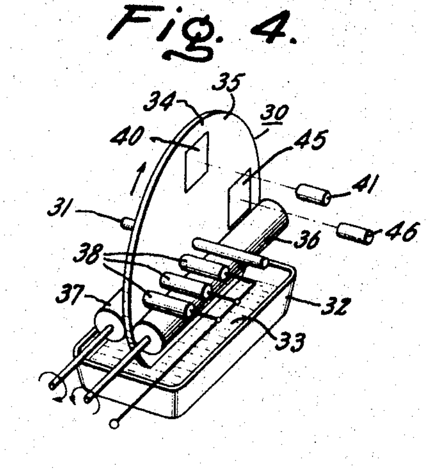

Other and specifically different objects of the invention will become more apparent to those skilled in the art from the more detailed description which follows, particularly when read with reference to the accompanying drawing in which FIGURE 1 is a schematic representation of a cross-sectional view of a recording member prior to the image development step, FIGURE 2A is a schematic representation of a cross-sectional view of one embodiment of a recording member as shown in FIGURE 1 after the image development step, FIGURE 2B is s schematic representation of a cross-sectional view of another embodiment of a recording member as shown in FIGURE 1 after the image development step, FIGURE 3 is a schematic representation of a cross-sectional view of another embodiment of a recording member, and FIGURE 4 is a schematic representation of an apparatus embodying a liquid recording medium according to the invention.

Briefly stated, it is known that (a) polarizable uncharged particles will move into zones of high electrostatic charge in nonuniform electrostatic fields, (b) non-polarizable uncharged particles will move away from zones of high electrostatic charge in such fields, (c) charged particles will be attracted or repelled, depending upon their charge relative to a point or line of charge in such fields, (d) dielectric liquids will themselves move in response to such fields, and (e) particles can be dispersed or precipitated or deposited by non-uniform electrostatic fields. This behavior of such particles is more particularly discussed in "Some Effects of Nonuniform Fields on Dielectrics" by H. A. Pohl in the Journal of Applied Physics, vol. 29, No. 8, pages 1182 to 1189, August 1958. These phenomena are employed by this invention to produce image patterns in either liquid or solid dielectric recording media in the following manner. A non-uniform electrostatic charge or force pattern is produced in any one of several known manners upon or within a film or layer of a suitable transparent dielectric medium containing a plurality of non-transparent particles. If the medium is a thermoplastic solid, it is heated to the liquid state permitting the particles to migrate therein in response to the forces exerted by the non-uniform force field to form zones therein of varying particle density or population and hence varying degrees of opacity having a point-to-point correspondence to the variations in the strength of the non-uniform force field applied to the dielectric medium. The medium is thereupon cooled to the solid state to preserve the image pattern thus formed which may be either viewed directly or projected by conventional transmission optical systems. If the dielectric medium is a liquid at ambient temperature, no heating or cooling step is necessary and the particles may be caused to migrate to positions defining an image pattern by the non-uniform force field, forming a display system which may be viewed directly or by projection.

Images formed in normally solid materials as aforesaid may be produced from charge patterns induced on the surface of a thermoplastic recording member by an electron beam as disclosed in United States Patent 3,113,179 to W. E. Glenn, Jr., issued Dec. 3, 1963 and assigned to the assignee of the present application. Alternatively, a similar charge pattern may be produced by the photoplastic recording technique as disclosed in the copending United States patent application Ser. No. 79,260 filed Dec. 29, 1960 by the present inventor and assigned to the assignee of the present application, now U.S. Patent No. 3,291,601. Additionally, a non-uniform force field may be produced in such a recording member by the photocharge recording technique as disclosed in the copending United States patent application Ser. No. 231,138 filed Oct. 17, 1962 by the present inventor and a co-inventor Gordon J. Sewell and assigned to the assignee of the present application, and now abandoned in favor of continuation-in-part application Ser. No. 517,315, filed Dec. 29, 1965.

More particularly, as disclosed in the Glenn patent previously referred to, the recording medium is a thermoplastic dielectric film or layer supported upon a suitable substrate which has a higher softening temperature than the recording layer. A pattern of charges is produced upon the surface of the solid thermoplastic dielectric film by means of an electron beam. The thermoplastic film is then heated to its softening point and the non-uniform charge pattern causes the thermoplastic film to physically deform to produce a ripple pattern in its free surface which has a point-to-point correspondence to the pattern defined by the electron beam. The recording layer is then cooled and the ripple pattern is frozen in place. As disclosed, the so-produced image pattern may then be retrieved by projection through a schlieren optical system.

In the photoplastic recording technique disclosed in the patent application Ser. No. 79,260 previously referred to, a thermoplastic film similar to that disclosed by Glenn except that it also is a photoconductor is supported upon an electrically conductive layer or ground plane. A uniform charge is applied to the photoplastic recording film in the dark and is selectively discharged by exposure to a pattern of activating radiation such as light through a photographic negative or positive transparency to produce a remanent charge pattern in those areas which were not illuminated or only weakly irradiated. This remanent charge pattern causes the free surface of the photoplastic recording layer to deform into a ripple pattern when it is heated to its softening point in a manner analogous to that formed in thermoplastic recording as set forth previously with regard to the Glenn disclosure. Again, the pattern is frozen into the recording surface by cooling to room temperature and the image pattern may be viewed with a schlieren optical projector.

In the photocharge recording technique disclosed in patent application Ser. No. 231,138 previously referred to, a thermoplastic film similar to those previously described is employed as the recording medium except that instead of being a photoconductor it contains a dispersion of or has dissolved in it a photosensitive substance such as iodoform, for example, and is supported upon any suitable substrate, no ground plane being necessary. When the recording layer or film is exposed to an image pattern of activating radiation, an electrical force field is generated within the recording layer in those areas which have been irradiated. Upon thermal development as previously described, this internal force field causes the free surface of the softened recording medium to deform into a ripple pattern having a point-to-point correspondence to the pattern of the radiation. Again, the pattern may be frozen in place by cooling to room temperature and viewed by schlieren optics.

In all three of the foregoing recording techniques, the deformation image pattern may be erased by reheating the recording layer to a temperature somewhat above the softening point of the thermoplastic and cooling to room temperature after surface tension forces in the liquid film have caused the surface to flatten out. In the case of the first two techniques, the recording media may be reused but a new charge pattern must be provided. In the case of the latter photocharge recording technique, the recording medium may exhibit an unexplained "memory"

effect in that after erasure and without re-exposure, the original image pattern of deformations may be caused to reappear by merely repeating the development step of heating it to its softening point. Erasure and redevelopment of the deformation pattern has been repeated for as many as five to ten times before the original image pattern degrades significantly.

According to the present invention, any one of the previously described techniques for establishing a non-uniform electrostatic or force field on or within a dielectric recording film which is either in the liquid state or may be put into the liquid state.

More specifically and with particular reference to the accompanying drawing, one embodiment of the invention is illustrated in FIGURE 1 wherein a recording member 10 is shown in cross section and comprises a transparent support layer 11 which may be composed of any suitable organic resin such as, for example, polyethylene terephthalate, or glass. A thin transparent, electrically conductive film 12 is adherently deposited upon one of the major surfaces of substrate 11 and a transparent thermoplastic dielectric recording layer 13 is adherently deposited upon the conductive film as shown. A plurality of fine, non-transparent particles 14 are substantially evenly distributed through the recording layer 13.

In use, the pattern of electrostatic charges corresponding to the image pattern to be recorded is produced on the surface of the recording layer 13 as schematically illustrated in FIGURE 1. It will be understood that area 15 carries a higher charge than area 16 which in turn carries a higher charge than area 17 which in turn carries a higher charge than area 18 and that those areas which do not have plus and corresponding minus charge signs associated therewith bear little or no charge. It will thus be seen that the recording layer 13 is under the influence of a non-uniform electrostatic field. While under this influence, the recording layer 13 is heated to a temperature at which the thermoplastic material melts and attains a relatively low viscosity. At this point, depending upon the properties of the particles 14, they either migrate from uncharged areas or areas bearing lower levels of charge into areas of higher charge as shown in FIGURE 2A, or from areas bearing higher charge levels into areas bearing lower charge levels or into uncharged areas as shown in FIGURE 2B. After this has occurred, the liquified recording layer 13 is cooled back to its solid form and an image has been developed in the recording layer which has a point-to-point correspondence in terms of relative transparency and opacity to the image formed by the electrostatic charge pattern. Since, except for the particles 14, the recording member 10 is transparent, the image thus recorded and developed may be viewed directly or by conventional light transmission optical devices such as an ordinary photographic projector.

While the foregoing examples have dealt exclusively with transparent materials, except for the particles, and with optical "readout," it will be appreciated that other forms of readout are possible which would not require the use of transparent materials. For example, the recording member 10 might be made in the form of a flexible tape and the particles 14 might be composed of a material possessing ferromagnetic properties, such as those materials used in conventional magnetic tape recording. By forming a modulated pattern of density of the magnetic particles in the tape by means of the present invention, a magnetic recording could be made which could not be inadvertantly erased which is a problem encountered in the present conventional magnetic tape recording art. As presently conceived, such as recording tape made according to this invention as previously described would be passed through a uniform magnetic field to magnetize the individual particles. Zones of the tape having higher concentrations of particles would become more highly magnetized than zones of lower particle density. Since the modulations forming the image or information pattern in the recording layer depends upon relative particle concentration which is fixed unless the recording layer is remelted, even if the magnetic particles in the tape are accidentally demagnetized, the particles in the tape can be remagnetized to restore the image or information pattern. Such a tape would be highly useful for libraries which lend magnetic tape recordings.

Obviously, other readout techniques are available. For example, the dielectric properties of the thermoplastic dielectric recording layer 13 will be substantially different in zones having a high particle density from zones having lower particle densities, permitting readout by measuring the variations in the dielectric properties of the recording layer. Other and specifically different readout techniques will occur to those skilled in the art. Also, if the particles are of a fluorescent material, displays may be made by illuminating the medium with activating radiation such as ultraviolet light whereby the image or information pattern formed by the particles is caused to glow.

In the foregoing examples of the invention, the particles 14 have been disclosed as being substantially uniformly dispersed in the recording layer 13 prior to the development step. As an alternative, however, the particles may be initially confined to a relatively thin layer 20 as shown in FIGURE 3. In this embodiment of the invention, substrate layer 11 and conductive film 12 are substantially identical to the embodiment shown in FIGURE 1, but the recording layer of FIGURE 3 is a composite composed of layers 20 and 21. In this embodiment, initially layer 21 is composed of a transparent, thermoplastic dielectric material similar to the material of recording layer 13 but containing no particles. Layer 20 is preferably composed of the same material as layer 21 and contains substantially the same number of particles as the recording layer 13 of FIGURE 1 but in a substantially higher concentration. When a non-uniform charge pattern is applied to the recording layer similar to that disclosed in FIGURE 1 and the layer melted, the particles contained in layer 20 will migrate in response to the forces into layer 21 to produce a pattern similar to those produced in FIGURE 2A or 2B, depending upon the properties of the particles selected. A modification of this particular embodiment would be to reverse the positions of layers 20 and 21 by first applying layer 20 to the substrate directly over the conductive film and the appying layer 21 thereover.

A yet further embodiment of the invention is illustrated in FIGURE 4 wherein a transparent disk 30 is mounted for rotation on a spindle 31. A trough 32 is positioned below disk 30 and contains a sufficient amount of a photoconductive liquid recording medium 33 containing a suspension of particles so that the lowermost portion of disk 30 is submerged therein as shown. Surface 34 of disk 30 is provided with a transparent electrically conductive film or ground plane 35. As the disk 30 is rotated in the direction indicated by the arrow, a film or layer of the recording medium 33 is carried upwardly out of the trough on both major surfaces of the disk. A pair of rollers 36 and 37 are provided as illustrated, roller 36 having its surface spaced apart from surface 34 and functions to spread the film evenly on surface 34 and to regulate the film thickness while roller 37 is in contact with the back surface of disk 30 and functions to remove the film from that surface. A uniform electrostatic charge is then applied to the film of recording medium on surface 34 by any appropriate means such as, for example, conventional corona charging heads 38. The so-charged film is then exposed to a pattern of activating radiation schematically shown at 40 by means of a source 41 whereupon the uniform electrostatic charge is selectively discharged to form a non-uniform charge pattern. The particles suspended in the liquid film migrate in response to the non-uniform field as previously disclosed to form a pattern or image having point-to-point correspondence to the projected pattern 40 which is then rotated to the position indicated by numeral 45 whereupon a conventional optical transmission projection system schematically illustrated at 46 is adapted to project the image through the transparent disk 30 upon a screen for viewing. As the disk is further rotated, the zones of the liquid film which contains the particles forming the image which has been projected re-enters the liquid in the trough 32 and becomes dispersed therein. If necessary, agitating means may be provided to maintain a uniform dispersion of the particles in the trough and to aid in removing any residual film from the surface 34.

It will thus be seen from the foregoing disclosure that the recording techniques of the present invention involves producing a non-uniform pattern of electrical charges or forces on or within a layer or film of a dielectric liquid recording medium containing particles which are thereby caused to migrate within the recording layer to form a pattern of areas having particle densities which are modulated in accordance with the non-uniform charge or force pattern. As previously disclosed, this non-uniform charge or force pattern may be produced in a number of ways and the recording medium and the apparatus employed may be modified according to the technique employed. For example, if the charge or force pattern is to be applied by the use of a beam of electrons, the recording step must be carried out in a vacuum and, of course, no corona apparatus is used. Furthermore, the recording layer is not photoconductive nor does it contain a photocharge material. If the phenomenon of photoconductivity is to be employed, all the steps may be carried out at atmospheric pressure, but the recording layer must either contain a photoconductive material or be composed of such a material. Furthermore, a means such as a corona charging head must be employed to provide a uniform charge which is then selectively discharged by a pattern of an appropriate activating radiation to form the non-uniform force pattern corresponding to the image to be recorded. Furthermore, a conductive ground plane must be provided. If the photocharge or photovoltaic phenomenon is to be employed, the recording layer must contain a substance such as iodoform, for example, which responds to appropriate radiation to produce the desired non-uniform force pattern within the recording layer which corresponds to the image to be recorded. Similar to the photoconductive recording technique, no vacuum is required nor is corona charging necessary. If it is desired to employ charging to increase the recording sensitivity as disclosed in patent application Ser. No. 323,995 filed Nov. 15, 1963 in the names of the present inventor and Gordon J. Sewell entitled "Information Recording" and assigned to the assignee of the present invention, and now abandoned, apparatus as disclosed therein may be employed and a ground plane is necessary, otherwise it is not. All of the foregoing comments apply to the invention whether a recording medium is employed which is a solid at ambient conditions as illustrated by FIGURE 1, or a liquid as illustrated by FIGURE 4.

The substrate or support for the recording layer may or may not have to be transparent and may be either rigid or flexible. It must however be thermally stable under all conditions to which it is exposed and must not chemically or physically react with any of the materials to which it is exposed during the practice of the invention.

The conductive coating, when required, may be produced upon the substrate by any one of many well-known techniques and, where transparency is not required may constitute the substrate, e.g., aluminum foil may be employed.

The recording layer when a solid under ambient conditions may consist of any number of polymeric thermoplastic dielectric materials such as any of those disclosed in the previous mentioned patent and applications. It must not react either chemically or physically with any of the other materials it is exposed to during the manufacture and use of the recording medium and it must have a softening point above room temperature, have substantially infinite room temperature viscosity and a low viscosity at a temperature between 100° and 150° C., together with a relatively high electrical resistivity in ohm-centimeters. One such material is a commercially available polystyrene resin having an average molecular weight of approximately 20,000, a softening temperature of about 80° C. and an electrical resistivity of about $10^{17}$ ohm-centimeters. There are, of course, many other satisfactory materials. It should be noted at this point that while these polymeric thermoplastic materials such as those disclosed in the previously referenced patent and copending patent applications may be used in the practice of the present invention, they are employed in a manner distinctly different from that previously disclosed. In all the previous disclosures, the image pattern was formed by heating a film of the thermoplastic material to its softening point whereupon electrical forces on or within the film caused the softened surface to deform into a pattern of ripples and grooves which were then frozen in place by cooling the film. If the film of these earlier inventions were heated to a temperature higher than the softening temperature, e.g., to a point where the film became a liquid, surface tension forces overcame the electrical forces and no ripple and groove pattern was developed upon cooling, or if a previous image pattern of ripples and grooves existed, it was erased by such a treatment. In the case of the present invention, no ripple and groove pattern is desired, and since high mobility of the particles within the film is desired, it will be seen that the film must be heated beyond the softening point into the temperature range where the film is liquid and then cooled. When the recording film or layer is a liquid at room temperatures, such materials as carbon tetrachloride, mineral oil, benzene, di-isopropyl ketone, nitrobenzene, alpha-methylstyrene, and others may be used as well as mixtures of such liquids and solutions such as solutions of polystyrene in benzene, for example.

The particles to be dispersed in the dielectric recording medium may be made of many materials. They must, however, possess some property by which their relative concentration in a given volume of the matrix can be detected. For example, if an optical readout is to be employed, they must be optically distinguishable from the matrix. In this regard, they may be light absorbing, reflecting or light scattering, or have any combination of these properties. Similarly, if magnetic or electrical readout is to be used, they must have magnetic or electric properties which are different from the matrix. As examples of materials which are suitable for the particulate materials, carbon black, copper sulfide, polyvinyl chloride, talc, sodium chloride, alumina, silica, and titanium dioxide are useful, particularly in optical and electrical readout systems. In magnetic readout systems, ferromagnetic ceramics based upon $Fe_3O_4$ compositions and $Fe_3O_4$ are useful.

While for purposes of a more complete disclosure, certain specific compositions and materials have been disclosed, it will be obvious to those skilled in the art that other materials and combinations of materials as well as similar but different apparatus may be employed in the practice of the invention. Therefore, it is desired that the scope of the invention be limited only by the following claims.

What I claim as new and desire to secure by Letters Patent of the United States is:

1. A method for producing an image pattern comprising, supporting a film of liquid dielectric recording material containing a plurality of particles capable of migration through said material in response to an electrical force field upon a stable substrate, and producing a non-uniform electrical force field at said film which has a point-to-point correspondence to the desired image and which causes the migration of said particles in response thereto through said film to form a pattern of areas in said film having particle densities which are modulated in a point-to-point correspondence to the non-uniform electrical force field.

2. The method set forth in claim 1 wherein said film of dielectric recording material comprises a thermoplastic resin which is a solid film when said non-uniform force field is produced and is subsequently heated to a temperature at which it becomes liquid.

3. The method set forth in claim 2 wherein said liquid film of dielectric material is caused to solidify after said particles have migrated therein to form said pattern.

4. The method set forth in claim 1 wherein said dielectric recording material and the support therefor are transparent and said particles are opaque.

5. The method set forth in claim 1 wherein said dielectric recording material is opaque and said particles have properties enabling the detection of said pattern of areas by non-optical means.

6. The method set forth in claim 5 wherein said particles are ferromagnetic.

7. The method set forth in claim 5 wherein the dielectric constant of said particles is measurably different from the dielectric constant of said recording material.

8. An image pattern reproducing member comprising:

a support member providing a supporting surface, a film of a liquid dielectric recording material upon said supporting surface, and a plurality of fine particles contained within said film which are capable of migration through said material in response to an electrical force field applied thereto.

9. The member set forth in claim 8 wherein said film comprises a thermoplastic resin heated to a temperature at which it becomes liquid.

10. The member set forth in claim 8 wherein said support and said dielectric recording material are transparent and said particles are opaque.

11. The member set forth in claim 8 wherein said dielectric recording member is opaque and said particles have properties enabling the detection thereof by non-optical means.

12. The member set forth in claim 11 wherein said particles are ferromagnetic.

13. The member set forth in claim 11 wherein said particles are composed of a material having a dielectric constant which is measurably different from that of said dielectric recording material.

14. An image pattern reproducing system comprising in combination:

a support member providing a supporting surface, a film of a liquid dielectric recording material upon said supporting surface, a plurality of fine particles contained within said film which are capable of migration through said material in response to an electrical force field applied thereto, and means for producing a non-uniform electrical force field at said film which has a point-to-point correspondence to the image to be reproduced by said particles in said film.

15. A system as set forth in claim 14 which includes means for detecting the pattern of particles forming said image in said film after said particles have migrated under the influence of said non-uniform electrical force field.

16. A system as set forth in claim 15 wherein said film comprises a thermoplastic resin and said system includes means for heating said resin to a temperature at which it becomes liquid.

17. A system as set forth in claim 14 wherein said film comprises a thermoplastic resin and said system includes means for heating said resin to a temperature at which it becomes liquid.

18. A system as set forth in claim 14 wherein said dielectric recording member and said support are transparent and said particles are opaque.

19. A system as set forth in claim 14 wherein said dielectric recording member is opaque and said particles have properties enabling detection thereof by non-optical means.

20. A system as set forth in claim 19 wherein said particles are ferromagnetic.

21. A system as set forth in claim 19 wherein said particles have a dielectric constant which is measurably different from that of said dielectric recording material.

References Cited

UNITED STATES PATENTS 3,144,650 8/1964 Levine.
3,171,106 2/1965 Lemmond. 178—7.5; 346—74
3,262,122 7/1966 Fleisher.

RICHARD MURRAY, *Primary Examiner.*

H. W. BRITTON, *Assistant Examiner.*

U.S. Cl. X.R.